US012791654B2

(12) United States Patent
Kolych et al.

(10) Patent No.: US 12,791,654 B2
(45) Date of Patent: Nov. 10, 2026

(54) EXPLOITING PARASITIC OR COUPLING TO MERGE WLAN CHANNELS OF Wi-Fi RADAR

(71) Applicant: Cypress Semiconductor Corporation, San Jose, CA (US)

(72) Inventors: Igor Kolych, Lviv (UA); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 324 days.

(21) Appl. No.: 18/588,985

(22) Filed: Feb. 27, 2024

(65) Prior Publication Data

US 2025/0271537 A1 Aug. 28, 2025

(51) Int. Cl.

| | |
|---|---|
| ***G01S 7/00*** | (2006.01) |
| ***G01S 13/56*** | (2006.01) |
| ***G01S 13/86*** | (2006.01) |
| ***H04L 5/00*** | (2006.01) |
| ***H04W 84/12*** | (2009.01) |

(52) U.S. Cl.

CPC .............. *G01S 7/006* (2013.01); *G01S 13/86* (2013.01); *H04L 5/0048* (2013.01); *G01S 13/56* (2013.01); *H04W 84/12* (2013.01)

(58) Field of Classification Search

CPC .......... G01S 7/006; G01S 13/86; G01S 13/56; H04L 5/0048; H04W 84/12

See application file for complete search history.

(56) References Cited

U.S. PATENT DOCUMENTS

| | | | | |
|---|---|---|---|---|
| 10,145,949 | B2 * | 12/2018 | Kishigami | G01S 7/28 |
| 10,243,640 | B2 * | 3/2019 | Miyanaga | G01S 7/4008 |
| 12,332,369 | B2 * | 6/2025 | Asok Kumar | G01S 5/0205 |
| 2025/0355110 | A1 * | 11/2025 | Reial | G01S 13/878 |

* cited by examiner

*Primary Examiner* — Nazra Nur Waheed

(57) ABSTRACT

The embodiments described herein are directed at techniques to perform delay compensation for non-overlapping channels used for radar measurements. A device may receive a plurality of reference signals and a plurality of sensing signals on a plurality of non-overlapping wireless channels of a wireless network. The device may determine a plurality of channel transfer functions (CTF) s based on one of the plurality of reference signals and a corresponding one of the plurality of sensing signals. The device may correct each of the plurality of CTFs to generate a plurality of corrected CTFs. The device may merge the plurality of corrected CTFs to produce a merged CTF. The device may sense one or more objects within the wireless network based on the merged CTF.

20 Claims, 17 Drawing Sheets

EXPLOITING PARASITIC OR COUPLING TO MERGE WLAN CHANNELS OF Wi-Fi RADAR

TECHNICAL FIELD

The present disclosure relates generally to a communication device that employs communication protocol (e.g., Wi-Fi, Bluetooth, Bluetooth Low-Energy (BLE), etc.) as a radar for object detection, and more particularly to compensating delay from the radar measurements.

BACKGROUND

Object sensing technique is widely used to detect an object and estimate the object position and velocity. For example, radar system may be used to perform the object sensing technique by employing a radar transmitter and a radar receiver. The use of radar system in consumer devices, such as smart phones, Internet of Things (IoT) devices, and automotive vehicles, is becoming increasingly popular. IoT devices connected to an access point (AP) can act as radar sensors to perform sensing and tracking of the object. For example, the radar sensors can be used in many applications such as to detect a presence and movements people, vehicles, and animals.

Object sensing using a wireless local area network (WLAN) ("Wi-Fi sensing or WLAN sensing") signal is considered as an emerging solution for various applications. One of the reasons is because of the prevalent WLAN devices and the ubiquitous nature of WLAN signals that can lead to a wide coverage. Wi-Fi sensing can sense the environment, detect an object, and interpret a movement of the object. Wi-Fi sensing is capable to see through obstructions (e.g., walls) and simply a radar system that spans the range of the network coverage. Wi-Fi sensing allows for an object detection without mobile devices, allowing for tracking of objects that are not carrying a wireless device. The transmitted wireless signal may experience signal attenuation and amplitude distortion because of the presence of the object. Various applications using the WLAN signals include health monitoring, activity classification, people counting, and step counting.

BRIEF DESCRIPTION OF THE DRAWINGS

The present embodiments are illustrated by way of example, and not of limitation, in the figures of the accompanying drawings.

DETAILED DESCRIPTION

Figure 1A:
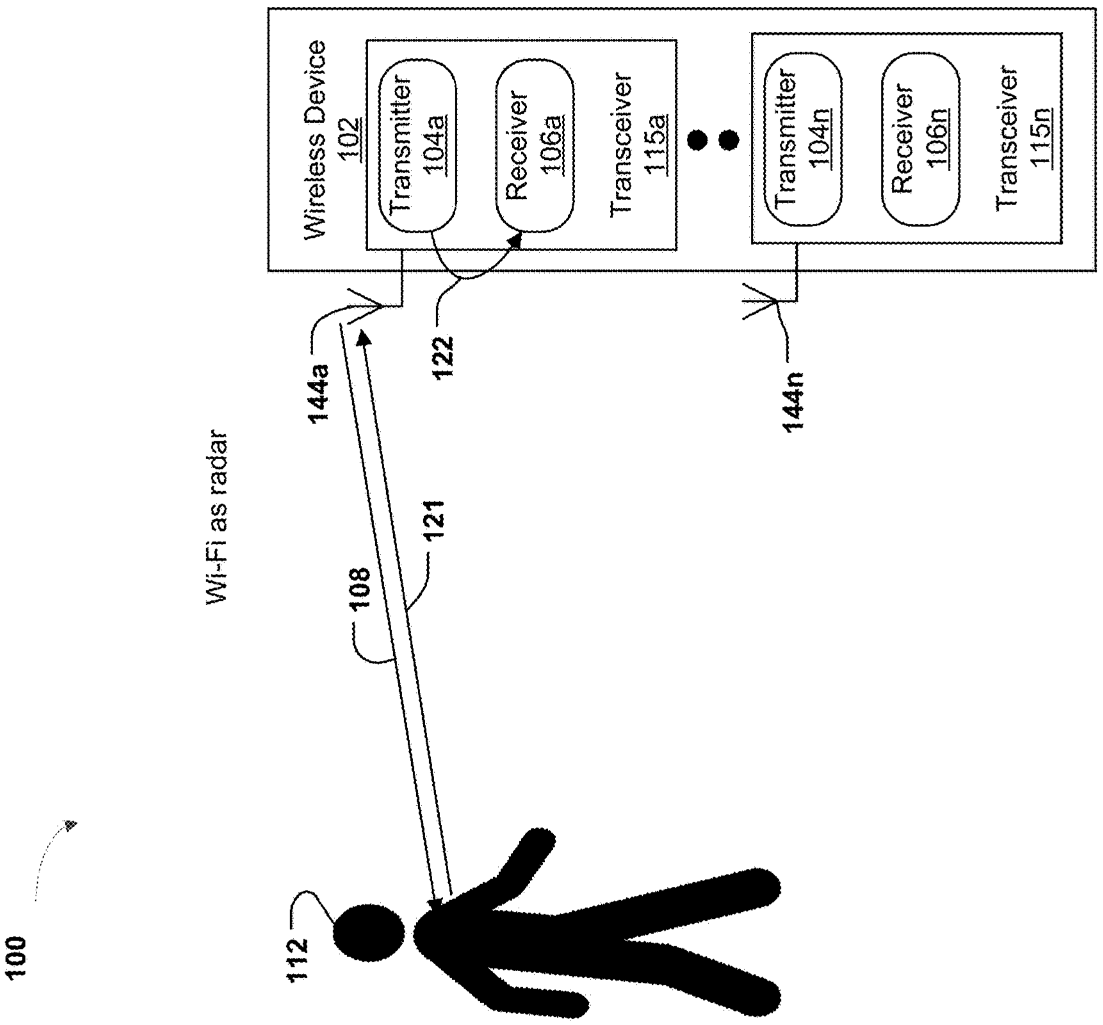
FIG. 1A is a block diagram illustrating a wireless local network (WLAN) based object detection system, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

A 2.4 Giga Hertz (GHz) frequency band of a wireless local network (WLAN), for example, has a total of 14 channels. In some examples, channels 1, 6 and 11 of the 2.4 GHz frequency band are non-overlapping channels so their bandwidth are usable. In another example, a 5 GHz frequency band offers more frequency space and has 25 channels. However, not all channels of the 5 GHz frequency band are usable. WLAN devices are configured for some operations on the non-overlapping channels.

Radar measurements may be performed to determine location information of an object. The challenge is to resolve two closely spaced objects which have the same range with respect to the Wi-Fi radar transmitter. To resolve two closely spaced objects requires an object detection system that is capable to obtain an improved sensing resolution.

Wi-Fi radar measurement performed on the non-overlapping channels may be combined to improve sensing resolution. Improved sensing resolution may resolve two closely spaced objects. Each of the non-overlapping channels may use different receiver chain. Because of this, different channel has a different delay and relative phase. The different delay and relative phase can cause incorrect baseline. As a result, the measurement of the reflected signal received at the receiver may be in accurate. Note that the reflected signal received at the received may include a sensing signal (reflected signal that is reflected off an object) and a baseline signal. Baseline signal may include signal from a parasitic coupling between the transmitter and the receiver. In addition, baseline signal may also include reflections from environment (e.g., cluttering). While Wi-Fi is described herein, similar techniques may be implemented with any wireless protocols, such as Bluetooth and Blue Low-Energy (BLE).

Compensating the effect of phase distortion caused in the analog and digital chain of a transceiver includes determining calibration parameters of a receiver operating on a first and second channel to determine changes caused by the phase distortion. Other solutions may also include performing temperature sensing to compensate the phase distortion by calculating a new phase distortion in response to identifying changes in the calibration setting. However, such solutions cannot determine all the parameters that cause the delay.

The embodiments described herein are directed at techniques to remove the phase distortion and signal propagation delay in analog and digital chain of a receiver to accurately combine overlapping Wi-Fi channels for radar sensing. Such techniques may be implemented, for example, when implemented may increase the increase radar sensing resolution.

In one embodiment, an apparatus is disclosed, the apparatus includes a device to receive a plurality of reference signals and a plurality of sensing signals on a plurality of non-overlapping wireless channels of a wireless network. The device determines a plurality of channel transfer functions (CTF) s based on one of the plurality of reference signals and a corresponding one of the plurality of sensing signals. The device corrects each of the plurality of CTFs to generate a plurality of corrected CTFs. The device merges the plurality of corrected CTFs to produce a merged CTF. The device senses one or more objects within the wireless network based on the merged CTF.

The device determines a peak of a frequency spectrum associated with each of the plurality of CTFs. The peak of the frequency spectrum corresponds to a delay distance. The device determines, based on the peak of the frequency spectrum, a delay. The device subtracts the delay from a phase of a subcarrier of each of the plurality of CTFs so that the peak of a frequency spectrum corresponds to a zero distance.

FIG. 1A is a block diagram of an example of an object detection system 100 utilizing a wireless device, according to some embodiments of the present disclosure.

Referring to FIG. 1A, the object detection system 100 may include a wireless device 102. The wireless device 102 may form a wireless network. The wireless network may be a WLAN. The wireless device 102 may be a WLAN device, a Wi-Fi device, or a be narrow band communication device capable of simultaneously transmitting and receiving a radio frequency (RF) signal as well as detecting a transmission time of the radar signal (WLAN, Wi-Fi, BLE, ZigBee). The WLAN device may include a circuitry for enabling radar sensing operation.

As shown in FIG. 1A, the wireless device 102 may include multiple transceivers 115*a*-115*n* with transmitters 104*a*-104*n* and receivers 106*a*-106*n*. The transceiver 115*a* may be coupled to an antenna 144*a* (transmit mode) to transmit a signal. The transceiver 115*a* may be coupled to an antenna 144*a* (receive mode) to receive a signal (e.g., radio frequency (RF) signal) in the wireless network. The transceiver 115*a* switches between the transmit mode and receive mode using a Tx/Rx switch (not shown). For example, the transceiver 115*a* operates in transmit mode and receive mode to measure the reference signal. The reference signal may include signal that propagates because of a coupling of the Tx/Rx switch. Similarly, the transceiver 115*n* may be coupled to an antenna 144*n* to transmit a signal. The transceiver 115*n* may be coupled to an antenna 144*n* to receive a signal. The transceivers 115*a*-115*n* may down convert the received signal to generate a baseband signal. The baseband signal may be processed (filtering, decoding, digitizing) by a receive chain (not shown) in the transceivers 115*a*-115*n*.

The object detection system 100 may be configured as a monostatic radar system. The monostatic radar is a radar system includes a transmitter (e.g., 104*a*-104*n*) and receiver (e.g., 106*a*-106*n*) that are separated by a distance comparable to the expected target distance. Note that although the present disclosure describes a monostatic radar configuration, other suitable radar configurations, such as bistatic or multi-static, may be used. Embodiments of the present disclosure may be implemented with the co-located transmitter and receiver having separate antennas (as shown) or a single antenna with a decoupling mechanism.

The example embodiments described herein are in the context of a WLAN system for simplicity only. It is to be understood that the embodiments described herein are equally applicable to other wireless devices of networks (e.g., Bluetooth, BLE, Pico networks, cellular networks, femto networks, satellite networks, WLAN, Wi-Fi-Direct, personal area network (PAN), ZigBee, Thread, Z-Wave, Sigfox, near-field communication (NF), millimeter wavelength communication (mm-Wave), or the like). The terms WLAN and Wi-Fi may be used interchangeably herein.

In some embodiments, the wireless device 102 may detect a presence of an object 112 within the wireless network using a wireless signal (hereinafter referred to as signal 108). The object 112 may be stationary or moving. Although the object 112 is illustrated as a person, the object 112 may also include (for example) a vehicle, an animal, a building, some furniture, a plant, a wall, or a glass window.

In some examples, the transmitter 104*a* transmits a signal 108 via an antenna 144*a* to the environment. The signal 108 propagates through space in the environment. The signal 108 may be reflected by the object 112 that is present within the environment. The signal 108 may be attenuated due to various phenomena (e.g., propagation, diffraction, scattering, multipath fading, or the like). The object 112 may alter the characteristics (e.g., amplitude, phase shift) of the signal 108. The object 112 can also affect the signal 108 to reflect, diffract, or scatter, which causes the signal to propagate across multiple propagation paths.

The signal that is altered may travel towards the receiver 106*a* and may be received by the receiver 106*a* as a reflected signal 121 via an antenna 144*a*. In addition, the receiver 106*a* may also receive a parasitic signal 122 that travels directly from the transmitter 104*a* to the receiver 106*a*. Upon receiving the reflected signal 121, the receiver 106*a* performs radar processing on the reflected signal to analyze the reflected signal 121. After the radar processing, the receiver 106*a* determines information about the object 112 within the environment. The information about the object 112 may include movement information (e.g., Doppler velocity and/or total velocity), position information (e.g., distance and/or angles), and/or size information (e.g., width, length, and/or height).

In some examples, the wireless the device 102 is a WLAN device operating as a radar device that can transmit and receive a signal simultaneously. If the object 112 is located far from the wireless device 102 or absent from the environment, the parasitic path associated with parasitic signal 122 may be dominant when compared to the reflected signal from the environment. The parasitic path may be referred to the path that the parasitic signal 122 travels from the transmitter 104*a*, 104*n* to the receiver 106*a*, 106*n*. The parasitic path may be assumed as zero distance because of the parasitic path has a small distance.

Figure 1B:
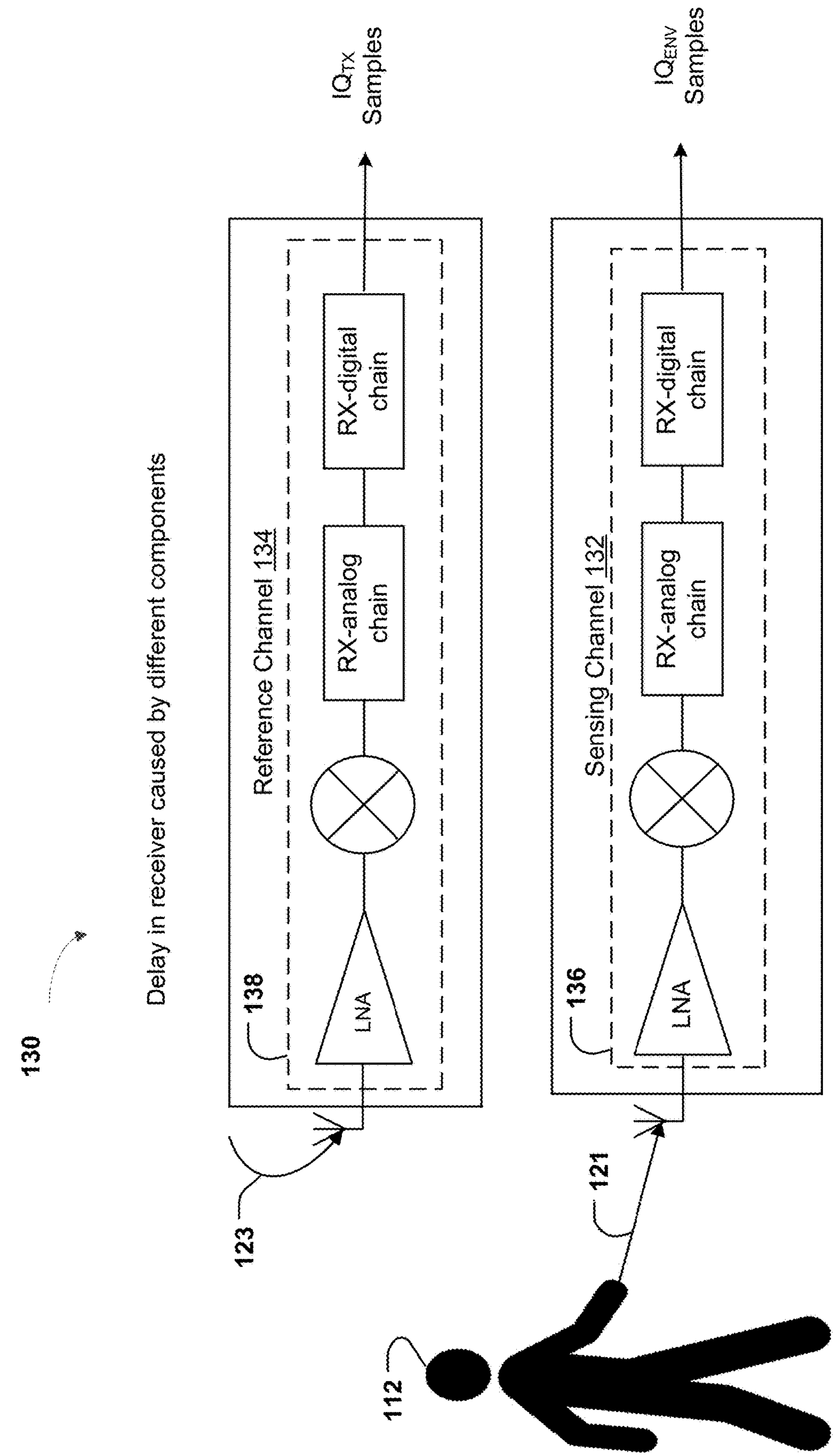
FIG. 1B is a block diagram illustrating a WLAN based object detection system, according to some embodiments of the present disclosure.

FIG. 1B is a block diagram of an example of a wireless device 130 according to an embodiment.

Referring to FIG. 1B, a wireless device 130 may include two receiver channels. For example, the receiver channels include a sensing channel 132 that measures the reflected signal 121. The reflected signal 121 received at the receiver of the sensing channel 132 may include a sensing signal associated with an object 112 and the baseline signal. The baseline signal may include the parasitic signal caused by the coupling within a transceiver, and the cluttering from the environment. The parasitic signal may also be caused by an internal coupling within the transceiver of the wireless device and an antenna coupling between multiple transceivers.

A reference channel 134 measures the reference signal 123 that propagates via a coupling of a transmitter and a receiver associated with a transceiver of a wireless device. Reference signal 123 may be associated with a transmitted signal. Reference signal 123 may be used to determine a transmission time and a shape of the transmitted signal associated with the sensing signal.

As shown, the receiver 106 as described in FIG. 1 can operate at different (non-overlapped) channels (e.g., sensing channel 132 and reference channel 134). Each channel may have its own receiver chain with a specific setting. For example, the receiver chain 136 of the sensing channel 132 may include components, such as low-noise amplifier (LNA), mixer, Receiver (Rx)-analog chain and Rx-digital chain. The receiver chain 138 of the sensing channel 134 may include components, such as LNA, mixer, Rx-analog chain, and Rx digital chain. Different components within each channel may cause different delay and relative phase.

Figure 1C:
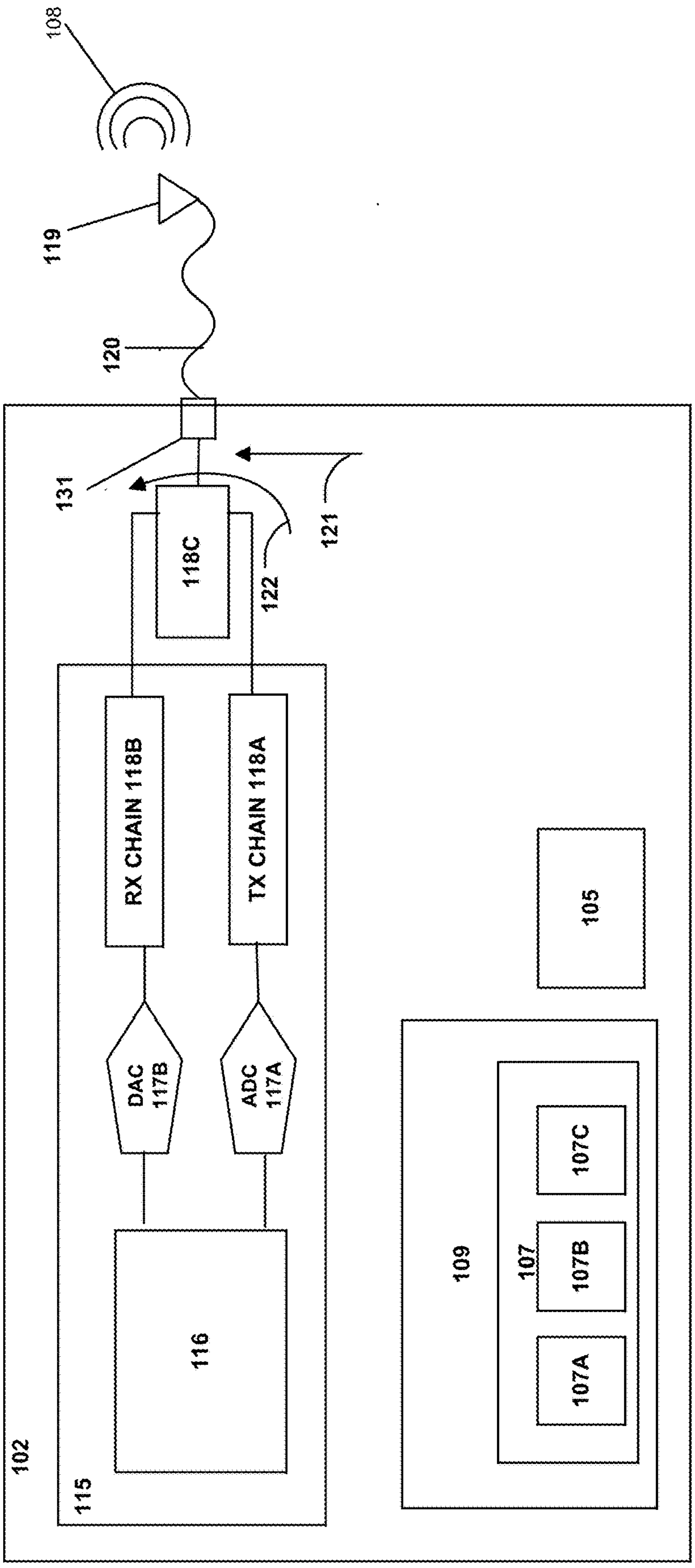
FIG. 1C is a block diagram illustrating a wireless communication device, according to some embodiments of the present disclosure.

FIG. 1C is a block diagram illustrating a communication device 102 (hereinafter referred to as device 102), which may be a communication circuit that includes a transceiver operating using a communication protocol.

In the example of FIG. 1C, the device 102 may include a WLAN transceiver 115. In addition, the device 102 may be implemented on a single die, or may be implemented using multiple dies in a single package. The WLAN transceiver 115 may comprise a transmit chain 118A and a receive chain 118B and both the transmit chain 118A and the receive chain 118B may be comprised of signal processing components such as a LNA, a mixer, a variable gain amplifier, and a low pass filter (not illustrated). The WLAN transceiver 115 may further comprise a Transmitter/Receiver (Tx/Rx) switch 118C to switch between the Tx chain 118A and the Rx chain 118B. More specifically, the Tx/Rx switch 118C may selectively couple the port 131 to the Tx chain 118A to allow for transmission of signals via an antenna 119 or couple the port 131 to the Rx chain 118B to allow for reception of signals via the antenna 119. A cable 120 may be coupled to the port 131 and to the antenna 119. The Tx chain 118A may also be coupled to an analog-to-digital converter (ADC) 117A which it may use to digitize received signals and output the digitized signals to a digital demodulator 116 (also referred to as a digital detector) which may extract any information content from the received digitized signals (e.g., by extracting the information bearing signal from a carrier wave). The Rx chain 118B may also be coupled to a digital-to-analog converter (DAC) 117B which it may use to convert the digitized received signals and output the analog signals to a digital demodulator 116.

As shown in FIG. 1C, device 102 further includes a processing device 105 and a memory 109 which may include channel merging module 107. Processing device 105 may execute the channel merging module 107 to perform the channels merging techniques described herein. Although illustrated by way of example as a software module stored in memory 109 and accessed/executed by processing device 105, the functionality of the channel merging module 107 may be realized using dedicated hardware (e.g., an application specific integrated circuit (ASIC)) or as a firmware module within the processing device 105. The channel merging module 107 may include a measurement module 107A, a delay compensation module 107B and a signal merging module 107C.

As will be seen, the processing device 105 may use the method discussed herein to determine a transfer function by using the WLAN transceiver 115 as the receiver device and the reference device.

Figure 1D:
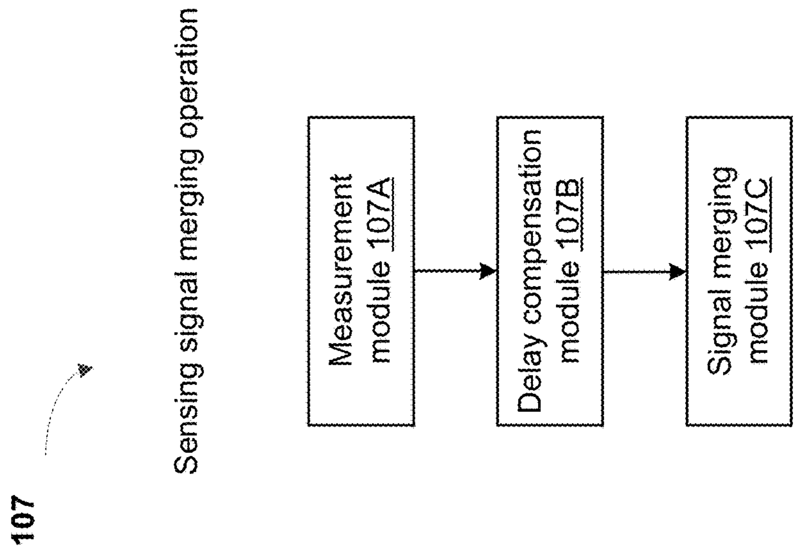
FIG. 1D is a block diagram of a technique for merging of non-overlapping WLAN channels, according to some embodiments of the present disclosure.

FIG. 1D illustrates a block diagram of a channel merging module 107 according to an embodiment. The channel merging module 107 may be implemented by wireless device 102 of FIG. 1A to detect the presence of an object (e.g., such as a person) in a wireless channel.

Referring to FIG. 1D, channel merging module 107 may include a measurement module 107A, a delay compensation module 107B and a signal merging module 107C.

The measurement module 107A receives a reference signal and a reflected signal 121 from the environment. For example, measurement module 107A receives a reference signal that corresponds to the parasitic signal. Based on the reference signal and the reflected signal 121, the measurement module 107A may determine a CTF. The measurement module 107A may receive the reference signal and the reflected signal 121 from multiple channels. Each channel may contain different delays (or phase change) that may be caused by the analog and digital chain networks.

The delay compensation module 107B may determine a delay and relative phase distortion based on the CTF. For example, the delay compensation module 107B performs an inverse discreet Fourier transform (IDFT) or correlation to generate a frequency spectrum. The delay compensation module 107B determines a delay based on a peak in (e.g., IDFT/correlation) frequency spectrum caused by the parasitic or coupling signal.

The delay compensation module 107B may compensate the delay by subtracting the delay from the phase of the subcarrier. In this manner, the correlation peak aligns for all WLAN channels.

The signal merging module 107C merges the corrected CTF (before or after baselining).

The corrected CTF may be used to correct future measurements. A peak of the corrected CTF may correspond to a zero distance on the x-axis of the corrected CTF (will be described in details in connection with FIG. 3). The corrected CTF may exclude the parasitic coupling and cluttering by subtracting the baseline. The corrected CTF provides an estimate of the analog/digital chains settings to use for future measurements of a similar environment condition. An average of the corrected CTF for particular channel may be used to remove dynamical changes (e.g., moving object) from the measurement.

Figure 2:
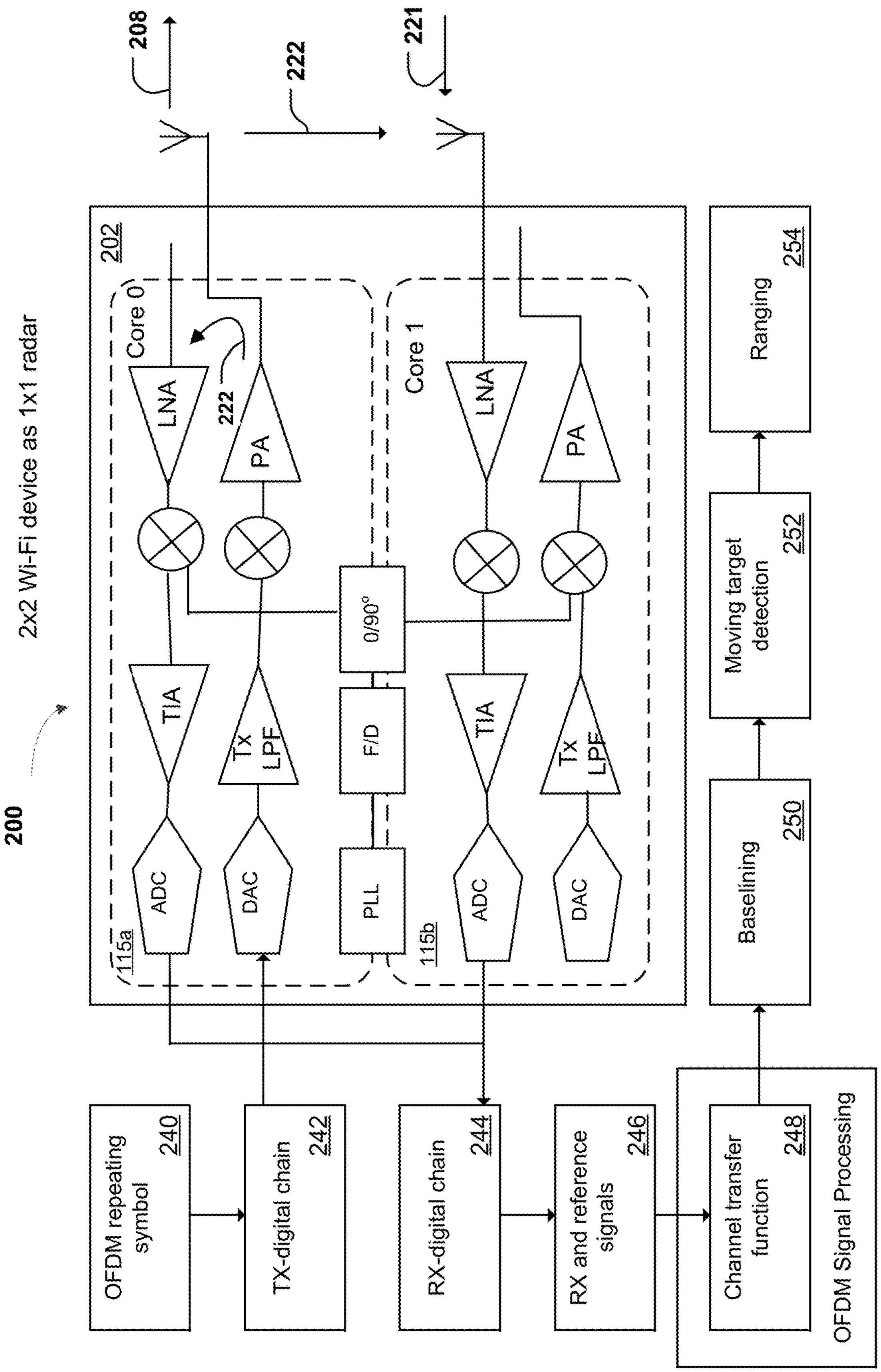
FIG. 2 is a block diagram illustrating a WLAN based object detection system and its functionalities, according to some embodiments of the present disclosure.

FIG. 2 is a block diagram illustrating a wireless local network (WLAN) based object detection system and its functionalities, according to some embodiments of the present disclosure.

Referring to FIG. 2, the object detection system 200 may include a 2×2 Wi-Fi circuit 202 being used as 1×1 (1 Tx antenna and 1 Rx antenna) radar transceiver IC. The 2×2 Wi-Fi circuit 202 may include circuitry for enabling radar sensing operation for Wi-Fi device. FIG. 2 shows only one example of a Wi-Fi circuit 202 and various changes may be made to FIG. 2. Note that the Wi-Fi circuit 202 may include any number of each component illustrated in FIG. 2. Note that although the Wi-Fi circuit 202 only shows two transmitting and two receiving antennas (2×2) as illustrated in FIG. 2, any number of antennas may also be used. Although the Wi-Fi circuit 202 only shows two transceivers 115*a* and 115*b* as shown in FIG. 2, any number of transceivers could also be used.

In some embodiments, orthogonal frequency division multiplexing (OFDM) repeating symbols may be used as a signal to sense the environment. For example, using the OFDM symbol generator 240, the transmitter chain 242 transmits an OFDM-based signal 208 to the environment. Although the OFDM-based signal is illustrated in this embodiment, other suitable waveforms (e.g., modulation type) for sensing operations such as an orthogonal time frequency space signal (OTFS) may be used. Any waveform having suitable self-correlation properties may be used for the signal to perform radar sensing in this embodiment. During the transmission operation, a parasitic signal 222 may travel from the transmitter to the receiver. The parasitic signal 222 may be received and processed using a receiver chain 244. The parasitic signal may be used as a reference signal.

The receiver chain 244 may receive a reflected signal 221 from the environment. The reflected signal 221 may be based on the signal 208 that is reflected off an object in the environment.

The receiver and reference signal calculator 246 may obtain the reference signal based on the parasitic signal 222 received by the receiver chain 244. The receiver and reference signal calculator 246 may obtain the reflected signal 221.

Based on the reference signal and the reflected signal 221, CTF generator 248 (corresponds to the delay compensation module 107B module) may determine a CTF. For example, the delay compensation module 107B may extract the complex amplitude of each subcarrier of the reflected signal 221 and the reference signal 222. Then, for each subcarrier, the delay compensation module 107B module calculates a ratio between the complex amplitude of the reflected signal 221 and the complex amplitude of the reference signal 222.

Note that for a 1×1 Wi-Fi device operating as a 1×1 radar, the CTF may be calculated based on the characteristic of the reflected signal 221 (e.g., shape and transmission time of the reflected signal).

The CTF generator 248 may perform a delay compensation to compensate a delay and relative phase caused by the analog and digital components of the receiver chain. Pi-jump in phase of the CTF may be compensated if needed. In this manner, during the baselining operation 250, the static or slowly changing environment and parasitic signal contribution may be removed. Therefore, the reflected signal that may not include the parasitic signal contribution and can be utilized to detect the object accurately.

The above-described procedures may be repeated for a number of different channels before the reflected signal is used for detecting the object. The reflected signals without the parasitic signal contribution may be merged to obtain a higher resolution measurement for detecting the object accurately.

After the merging of the signals, the wireless device 102 may perform object detection using the moving target detection operation 252 to detect a presence of an object in the environment. The wireless device 102 may perform object ranging using a ranging operation 254 before the wireless device 102 generates a sensing report based on the presence of the object in the environment. The sensing report may include distance (range), angle and radial velocity of the object relative to the transceiver.

Figure 3:
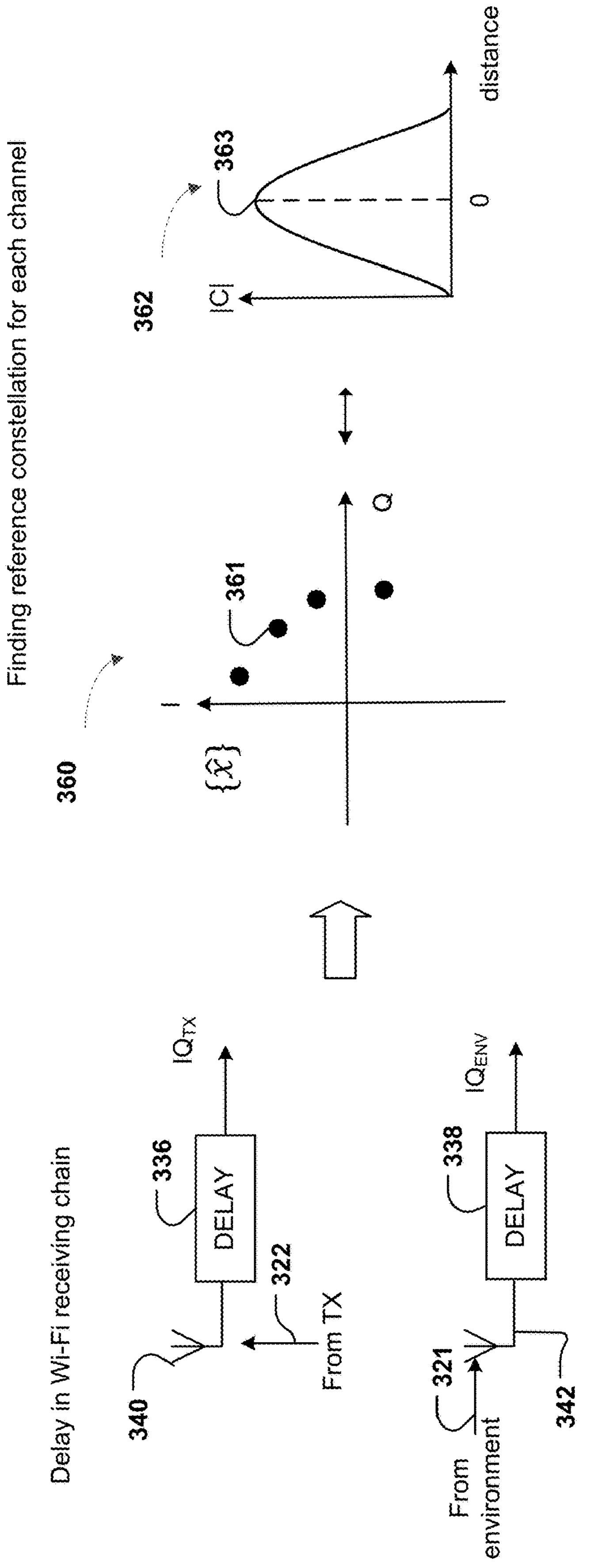
FIG. 3 is a block diagram illustrating a delay compensation technique, according to some embodiments of the present disclosure.

FIG. 3 illustrates a delay compensation technique for determining a reference constellation for a channel, according to some embodiments of the present disclosure. The reference constellation may refer to a constellation diagram representing the corrected sets $\{\hat{x}\}$ of the corrected CTF. The reference constellation may have a corresponding frequency spectrum including a peak (maximum) that corresponds to a zero delay (without a delay). The peak may also be referred to as maximum in this disclosure.

Referring to FIG. 3, a Wi-Fi device with radar capability may include two transceivers. For example, a 2×2 Wi-Fi device includes a first transceiver having a first receiver chain 336 and a second transceiver having a second receiver chain 338.

The first receiver chain 336 receives a reference signal 322 that travels from the transmitter of the transceiver. The reference signal 322 may correspond to a signal that travels from a transmitter directly to the receiver via an internal parasitic or design coupling. The parasitic signal may be used to calculate the propagation time of a signal. The second receiver chain 338 receives a reflected signal 321 that is reflected off an object in the environment. The reflected signal 321 may also include parasitic signals from a coupling between two transceivers. Antenna 340 may be utilized to receive a reference signal 322 over a predetermined bandwidth as shown in FIG. 3. Antenna 342 may be utilized to receive a reflected signal 321 over a predetermined bandwidth as shown in FIG. 3.

In-Phase (I) and Quadrature (Q) samples of the ratio of the reflected signal and the reference signal may be represented by a constellation diagram. The IQ samples are out of phase with each other. A constellation diagram is a two-dimensional method of visualizing the signal. For example, the constellation diagram 360 shows a set of subcarriers of the reference signal relative to the transmitted signal on I-Q domain. A particular symbol (e.g., symbol 361) on the constellation diagram corresponds to a particular frequency (e.g., a particular subcarrier for the OFDM signal). Because of the different delay, the location of the phase of the particular subcarrier on the constellation diagram may shift.

A frequency spectrum 362 may be generated based on the constellation diagram by using a correlation technique or an inverse discrete Fourier transform (IDFT). The frequency spectrum may be used to determine a peak 363 that corresponds to a zero distance. The peak 363 may correspond to a peak of the frequency spectrum that has a maximum amplitude. For example, when the receiver receives a reference signal or a parasitic signal, the peak 363 of the frequency spectrum corresponds to a zero distance. In this situation, the parasitic signal is dominant compared to the reflected signal.

Figure 4:
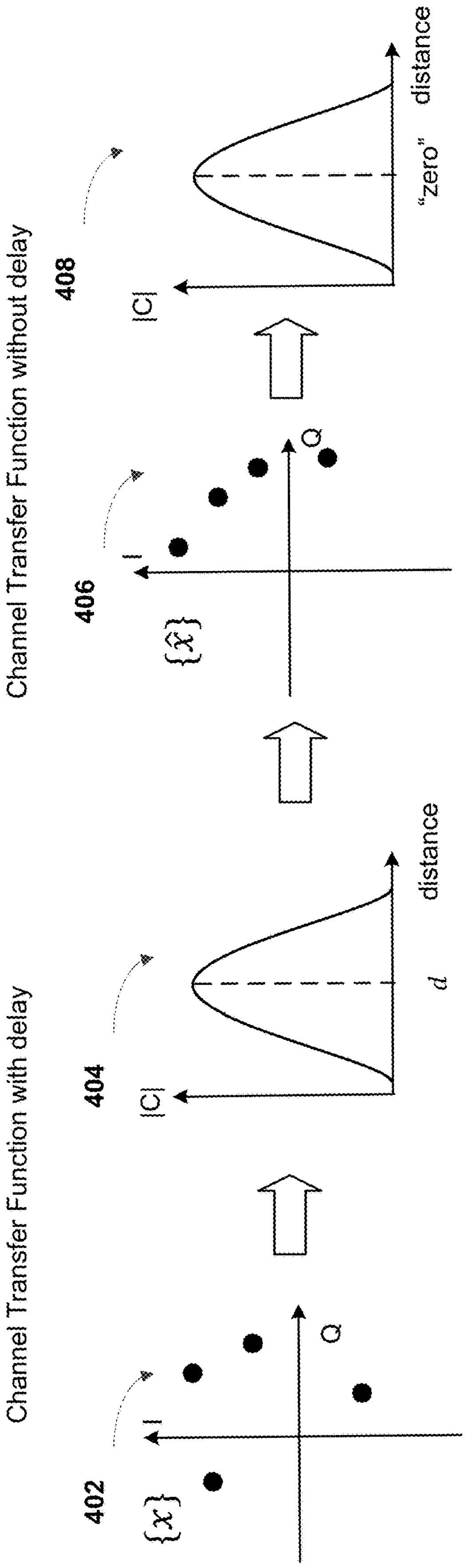
FIG. 4 is a block diagram illustrating a constellation diagram of a channel transfer function (CTF) before and after a delay compensation technique is implemented, according to some embodiments of the present disclosure.

FIG. 4 is a diagram illustrating a delay compensation technique for determining a CTF with and without delay components, according to some embodiments of the present disclosure.

Referring to FIG. 4, a CTF may be determined based on a reflected signal and a reference signal. For example, delay compensation module 107B of FIG. 1 measures the CTF {x} that provides a constellation diagram 402, which includes delay.

The delay compensation module 107B module performs correlation (or IDFT) to generate a frequency spectrum |C| 404 that has peak at "delay" distance.

To remove the delay that is identified in the frequency spectrum 404, the delay compensation module 107B module may determine a delay, Δ. For example, the delay can be determined based on an equation, Δ=d/c, where Δ is a delay, d is a distance obtained from the frequency spectrum 404, and c is the speed of light.

After the delay has been determined, the delay compensation module 107B module may perform a delay compensation for each subcarrier of the channel. The delay compensation for the subcarrier may be performed according to the following equation to generate the corrected set $\{\hat{x}\}$.

$$\hat{x}_j = x_j * \exp(-i\omega_j\Delta)$$

where $\omega_j$ is an angular frequency of a subcarrier j of a channel, Δ is a delay.

A constellation diagram 406 represents the corrected sets $\{\hat{x}\}$ of the corrected CTF. The corresponding frequency spectrum 408 includes a peak that corresponds to a zero delay (without a delay). This means the delay caused by the analog and digital component in the receiver chain has been compensated.

Figure 5:
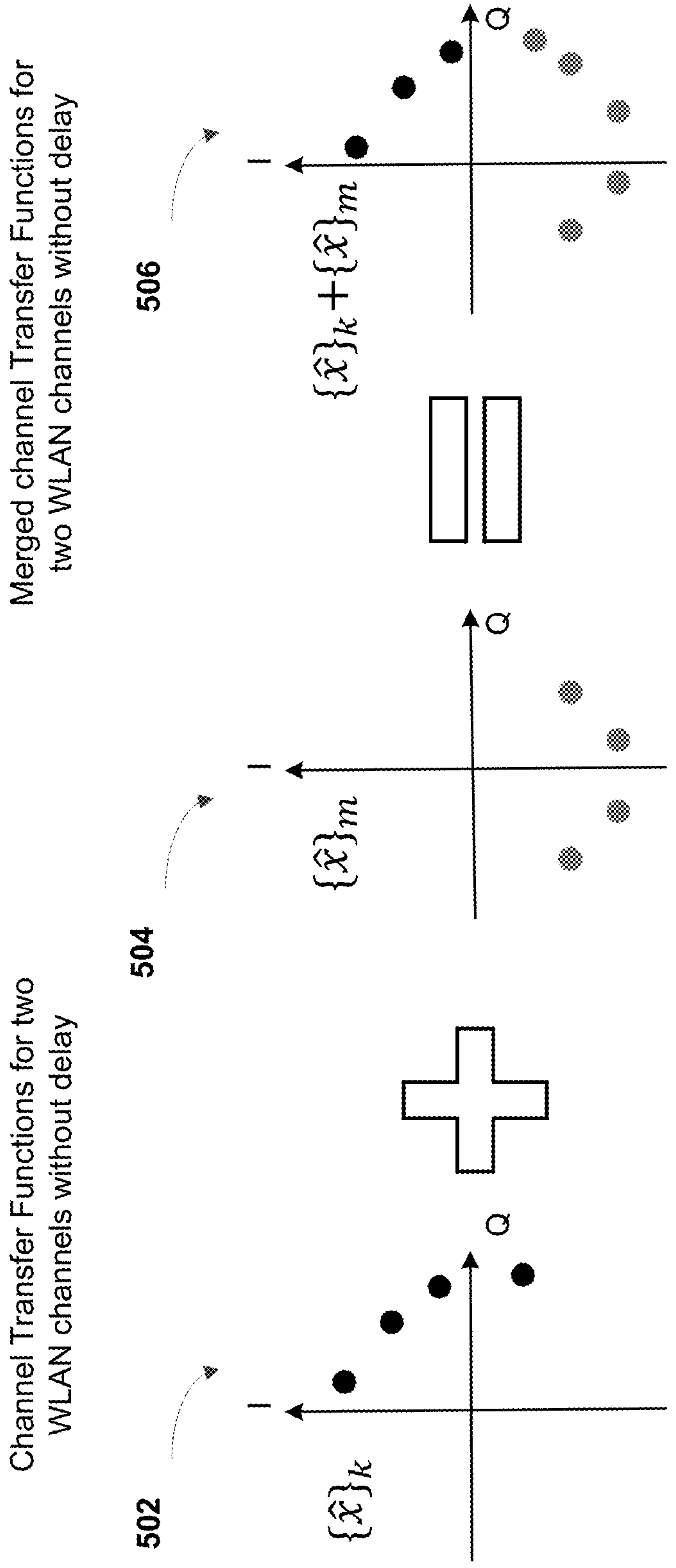
FIG. 5 is a block diagram illustrating a constellation diagram of a CTF after the delay compensation technique is implemented as a reference for a particular measurement, according to some embodiments of the present disclosure.

FIG. 5 is a diagram illustrating a delay compensation technique for merging CTFs without delay components, according to some embodiments of the present disclosure.

Referring to FIG. 5, a constellation diagram 502 represents a corrected CTF of a first wireless channel $\{\hat{x}\}_k$ without the delay. The horizontal real axis of the constellation diagram represents the Q component, and the vertical real axis of the constellation diagram represents the I component. The delay compensation technique has been applied to the CTF of the first wireless channel. A constellation diagram 504 represents a corrected CTF of a second wireless channel $\{\hat{x}\}_m$. Similarly, the delay compensation technique has been applied to the CTF of the second wireless channel.

Because the delay has been compensated in first wireless channel and the second wireless channel, the corrected transfer function of the first wireless channel $\{\hat{x}\}_k$ and the corrected transfer function of the second wireless channel $\{\hat{x}\}_m$ can be merged. In this manner, the resolution of the sensing system can be enhanced. For example, a constellation diagram 506 represents a transfer function of the first wireless channel $\{\hat{x}\}_k$ and the second wireless channel $\{\hat{x}\}_m$ that has been merged. Note that although there are only two wireless channels as shown in FIG. 5, more wireless channels may also be measured to accommodate the expected sensing resolution.

In some embodiments, a plurality of non-overlapping wireless channels include a first non-overlapping wireless channel. The corrected CTF associated with the first non-overlapping wireless channel may be generated based on a first measurement of a first reference signal and a first sensing signal at a first time period. The corrected CTF associated with the first non-overlapping wireless channel may be used to determine a new corrected CTF associated with a second measurement of a second reference signal and a second sensing signal at a second time period.

Figure 6:
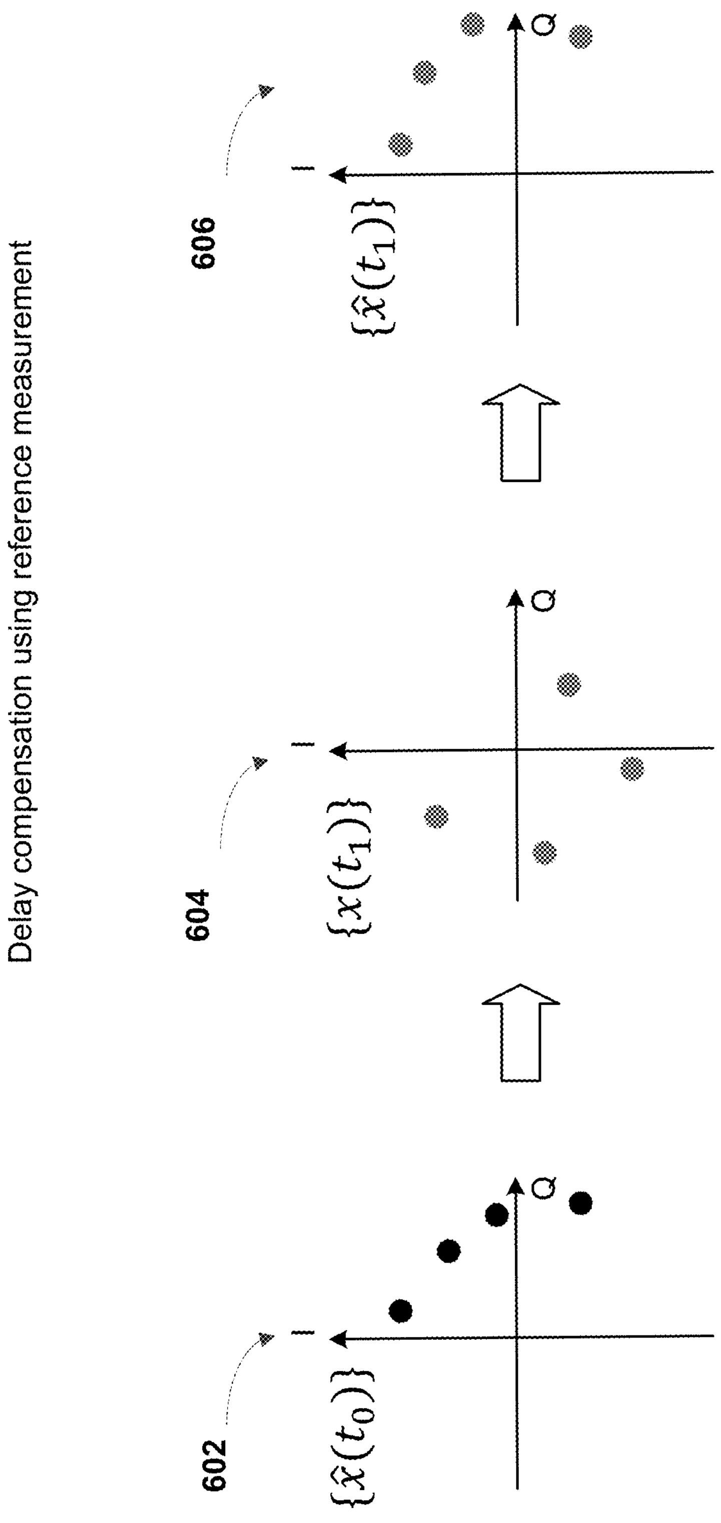
FIG. 6 is a block diagram illustrating a constellation diagram of a CTF after the delay compensation technique is implemented to detect sensing environment changes, according to some embodiments of the present disclosure.

FIG. 6 is a diagram illustrating a delay compensation technique based on a reference corrected CTF, according to some embodiments of the present disclosure.

Referring to FIG. 6, a constellation diagram 602 represents a corrected CTF at time $t_0$ denoted as $\{\hat{x}(t_0)\}$. The corrected CTF at time $t_0$ can be used as a reference CTF for a measurement at a different time, for example, at time $t_1$. A constellation diagram 604 represents a corrected CTF of a measurement at time $t_1$ denoted as $\{x(t_1)\}$. The delay compensation operation can be applied to the measurement at time $t_1$ based on the reference CTF using a minimization Euclidian distance technique. For example, the minimization Euclidian distance technique may be given as $|\{\hat{x}(t_0)-x(t_1)*\exp(i\omega\Delta)\}|^2 \rightarrow 0$ for given Δ where Δ is the delay. Referring to FIG. 6, the minimization Euclidian distance technique may be applied to the measurement at time $t_1$ as denoted by the constellation diagram 604. The corresponding frequency spectrum 606 indicates a corrected CTF of a measurement at time $t_1$ with the delay has been compensated.

This correction technique may be used to compensate pi-jump which is caused by dividing VCO frequency.

In some embodiments, the corrected CTF associated with the first non-overlapping wireless channel may be subtracted from the new corrected CTF associated to determine a change in an environment between the first time period and the second time period.

In some embodiments, a second reference signal and a second sensing signal at a future time may be received. The future time may refer to a later time than an initial time. A second CTF based on the second reference signal and a second sensing signal may be determine. The corrected CTF may be compared (e.g., subtracted) from the second CTF to determine the changes in the environment. The corrected CTF may refer to the corrected CTF.

Figure 7:
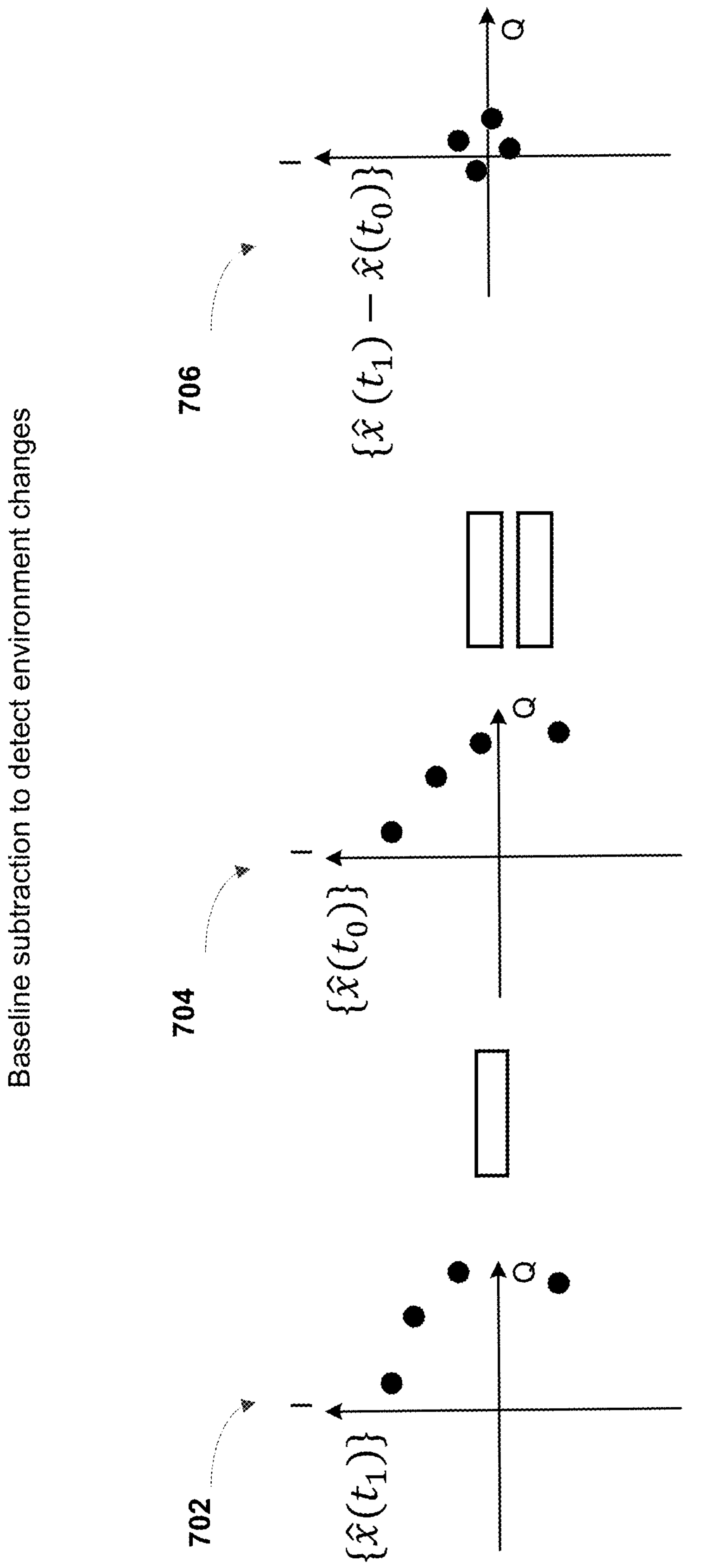
FIG. 7 is a block diagram illustrating a delay compensation technique, according to some embodiments of the present disclosure.

FIG. 7 is a diagram illustrating a delay compensation technique for detecting environment changes, according to some embodiments of the present disclosure.

Referring to FIG. 7, a constellation diagram 702 represents a corrected CTF of a measurement at time $t_1$ denoted as $\{\hat{x}(t_1)\}$. A constellation diagram 704 represents a corrected CTF at time $t_0$ denoted as $\{\hat{x}(t_0)\}$.

The corrected CTF at time $t_0$ is $\{\hat{x}(t_0)\}$ can be used as reference for measurements $\{x(t_1)\}$ at time $t_1$ using minimization Euclidian distance between the measurements at time $t_1$ and $t_0$.

For example, the minimization Euclidian distance technique may be given as $|\{\hat{x}(t_0)\}-\{x(t_1)*\exp(i\omega\Delta)\}|^2 \rightarrow 0$ for given Δ where Δ is the delay.

The corrected CTF of a measurement at time $t_1$ $\{\hat{x}(t_1)\}$ may include information about changes in the environment $\{s(t_1)\}$.

The changes in the environment $\{s(t_1)\}$ may be determined based on the corrected CTF at time $t_0$. For example, the changes in the environment $\{s(t_1)\}$ is determined by subtracting the corrected CTF at time $t_0$ from the corrected CTF of a measurement at time $t_1$ $\{\hat{x}(t_1)\}$. The changes in the environment $\{s(t_1)\}$ 706 may be determined using $\{s(t_1)\}=\{\hat{x}(t_1)-\hat{x}(t_0)\}$. This process may be defined as baselining in which a corrected CTF at a time t is subtracted from a corrected CTF at a future time (t+x). The baselining may remove the parasitic signal and cluttering from the reflected signal received at the receiver.

After the baselining, the reflected signals from different channels can be merged to increase the sensing resolution. Note that the sensing from different channels can be merged signals after the baselining. For example, the changes in the environment for channel k $\{s(t_1)\}_k$ is merged with the changes in the environment for channel m $\{s(t_1)\}_m$ after the baselining according to the following equation:

$$\{s(t_1)\}_{k+m} = \{s(t_1)\}_k + \{s(t_1)\}_m$$

Figure 8:
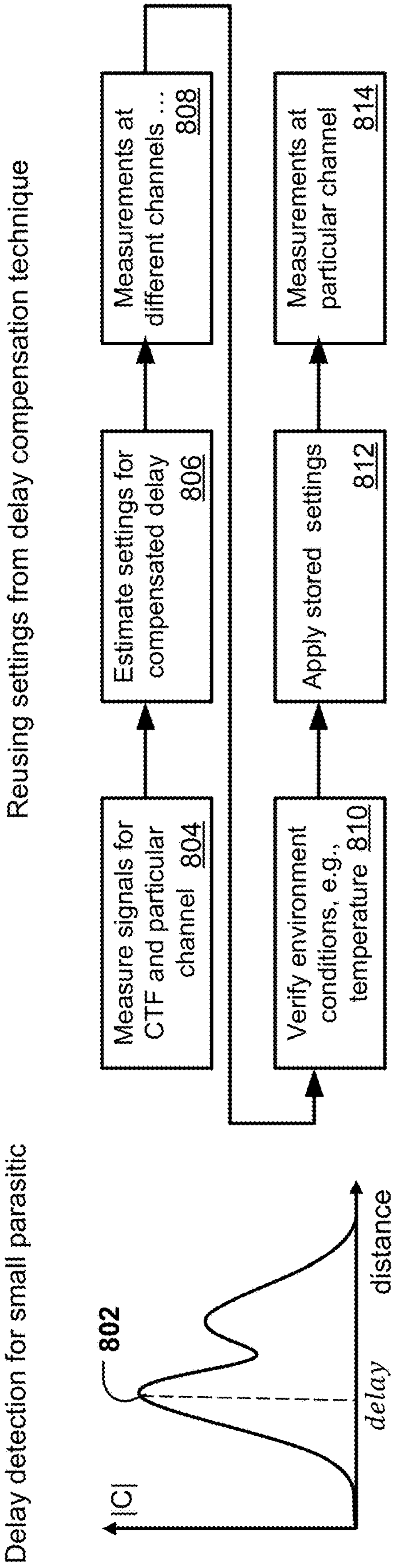
FIG. 8 is a functional block diagram illustrating a delay compensation technique, according to some embodiments of the present disclosure.

FIG. 8 is a diagram illustrating a delay compensation technique for reusing settings, according to some embodiments of the present disclosure.

In some embodiments, if the amplitude of the parasitic signal is equal to the amplitude of the sensing signal, CTF may include multiple peaks. In this case, the first peak of the frequency spectrum may correspond to the parasitic signal. For example, if the parasitic signal is comparable to the sensing signal, the object of closely located objects may appear closer than the actual distance. If the object is far with respect to the receiver, the first peak of the frequency spectrum may correspond to the parasitic signal.

In some embodiments, if the amplitude value of the parasitic signal is smaller than the amplitude value of the reference signal, a first correlation peak of the CTF may correspond to the parasitic signal. For example, if the reflection of the transmitted signal is larger than parasitic signal, the first peak 802 of the frequency spectrum may correspond to the parasitic signal. Note that the reflection of the transmitted signal may correspond to the reflected signal.

To improve the detection of the peak in the frequency spectrum, a peak search technique, such as MUltiple SIgnal Classification (MUSIC) may be used. MUSIC is a high-resolution direction-finding algorithm based on the eigenvalue decomposition of the sensor covariance matrix observed at an array. For example, if the peaks are close to each other, MUSIC can be used to separate the peaks and identify the peak of the frequency spectrum.

If peaks are aligned for different channels (the distance corresponding to the peak of the frequency spectrum is zero), parameters of the digital or analog front-end of a receiver chain can be determined to establish settings for a particular WLAN channel. For example, the delay compensation technique as described herein may be used to determine a delay for a receiver chain with a particular setting and operating on a particular channel. The receiver chain may have a particular setting for automatic gain control (AGC), imbalance compensation, analog and digital filters, etc. The setting for the particular receiver chain and the delay for the operating channel may be stored. The stored particular setting of the receiver chain and the delay may be used for a future measurement of the particular channel. The stored delay may be used as an initial value to perform the delay compensation technique as described above. Therefore, the stored settings can be used for future measurements to decrease the search operation for the peak in the frequency spectrum.

In this manner, the delay compensation technique may reduce the computation time for environment with similar conditions.

For example, as shown in FIG. 8, a measurement of a sensing signal and a reference signal for a channel are received in step 804 to determine a CTF. Then, a compensation delay technique is applied to estimate the delay for compensating the delay from the sensing signal. The delay estimate may be used as a reference setting in step 806 for the next measurements in step 808 of the same channel. The environment of the measurement for different time of the same channel may be verified in step 810. For example, a temperature reading may be obtained using a temperature sensor to verify that the environment of the measurement is similar to the environment of the measurement to obtain the reference setting. If the environment of the measurement of the same channel is similar to the environment of the measurement to obtain the reference setting, the reference setting may be used in step 812 for current measurement. The current measurement in step 814 should provide the same delay for CTF that can be corrected.

Figure 9:
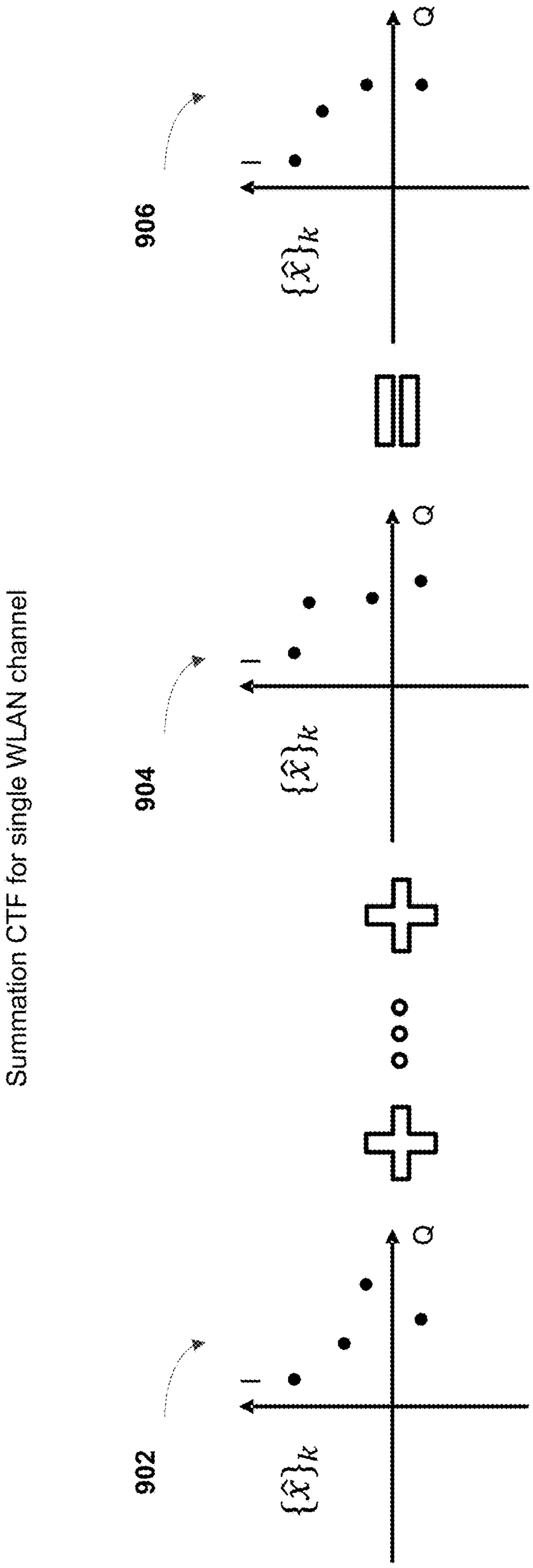
FIG. 9 is a block diagrams illustrating a delay compensation technique, according to some embodiments of the present disclosure.

FIG. 9 is a diagram illustrating a delay compensation technique for averaging for the corrected CTF, according to some embodiments of the present disclosure.

Referring to FIG. 9, an average of a set of corrected CTF may be determined to remove dynamical changes (e.g., movement of a fan). In some embodiments, the plurality of corrected CTFs may be averaged to generate an averaged corrected CTFs.

The average value may be based on performing the delay compensation on the reference signal and the sensing signal for the channel for at least one iteration. For example, a set of corrected CTF of a channel includes a corrected CTF 902 and a corrected CTF 904. The average 906 of the corrected of the set of corrected CTF is determined based on the corrected CTF 902 and the corrected CTF 904.

Figure 10:
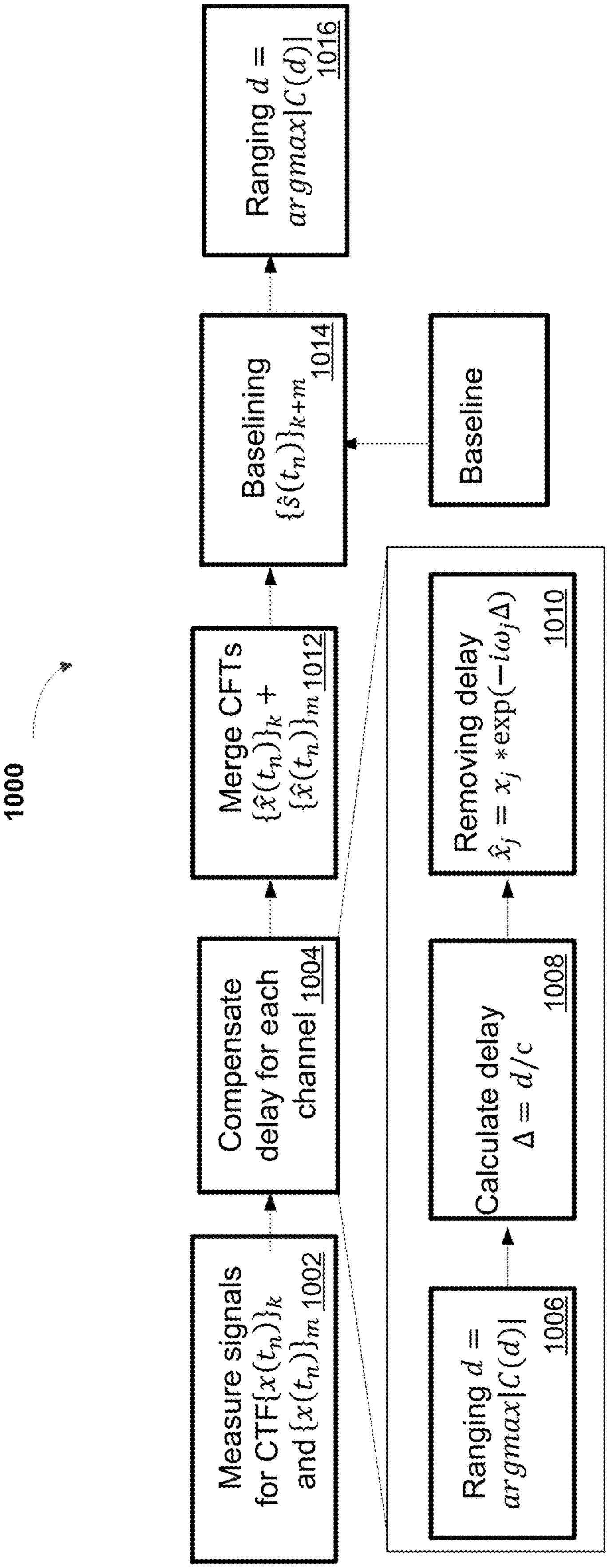
FIG. 10 is a functional block diagram illustrating a delay compensation technique implemented to remove the delay from the non-overlapping channels, according to some embodiments of the present disclosure.

FIG. 10 is a block diagram illustrating an example data processing method 1000 for an object sensing according to an embodiment.

Referring to FIG. 10, the data processing method is associated with a WLAN radar with two cores performing a measurement at time (or interval) $t_n$ for two different WLAN channels m and k to determine the CTF.

As shown, at 1002, the reference and the reflected signals may be obtained to determine the CTF.

At 1004, delay compensation may be applied to each channel to compensate the delay caused by filters in the receiving chain. For example, a frequency spectrum $|C(d)|$ for the CTF is determined.

At 1006, based on the frequency spectrum, a peak of the frequency spectrum is determined.

At 1008, the delay is determined based on the peak of the frequency spectrum.

At 1010, the delay is compensated for each subcarrier of the CTF to generate a corrected CTF.

Method 1002 and 1004 may be repeated for each non-overlapping channel.

At 1012, the corrected CTF of the different WLAN channels (e.g., channel k and m) may be merged. For example, the corrected CTF of a channel k and the corrected CTF of k channel m are merged.

At 1014, after the corrected CTF of the different WLAN channels are merged at 1012, the baselining operation as described above (e.g., see FIG. 7) may be applied to the merged corrected CTF of the non-overlapped, k and m channels. The baselining operation may be performed to remove the delay to detect a presence of an object in the environment. The baselining operation may also be performed before the operation 1012. The baselining operation 1014 may subtract the current measurement from the previous measurement for the same channels to identify changes (e.g., moving objects) in the environment.

Optionally, the baselining process 1014 may be applied to the channels separately before the merging of the corrected CTF of the channels. For example, firstly, the baselining process is applied to the corrected CTF of the channel k. Secondly, the baselining process is applied to the corrected CTF of the channel m. After the baselining process is performed for the channels k and m, the corrected CTF of a channel k and the corrected CTF of k channel m are merged.

At 1016, a ranging may be performed to determine a location information, including target location.

Figure 11:
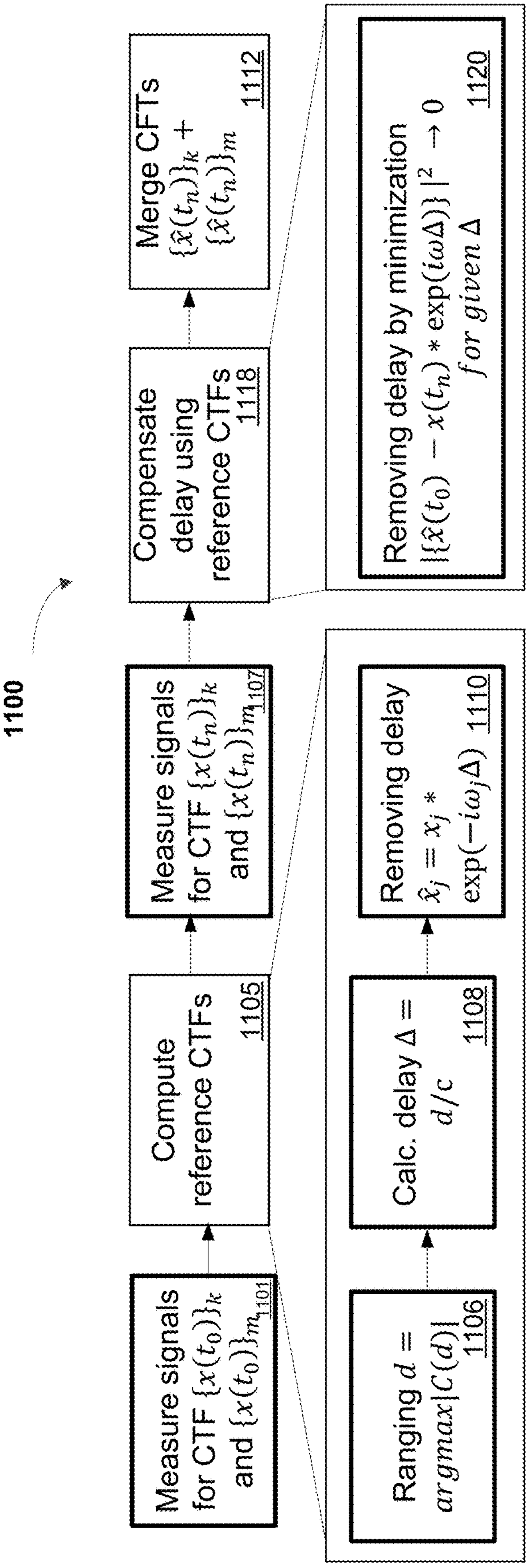
FIG. 11 is a functional block diagram illustrating a delay compensation technique implemented as a reference to remove the delay for a particular measurement, according to some embodiments of the present disclosure.

FIG. 11 is a block diagram illustrating an example data processing method 1000 for an object sensing according to an embodiment.

Wi-Fi radar may use initialization of delay compensation to reduce computation power. The procedures 1106, 1108, 1110 may be similar to procedures 1006, 1008, 1010 of FIG. 10.

At 1101, an initial measurement of two channels at time (or interval) $t_0$ be performed to determine the CTF. As shown, at 1101, the reference and the reflected signals may be obtained to determine the CTF of channel k at time $t_0$. Similarly, the reference and the reflected signals may be obtained to determine the CTF of channel m at time $t_0$.

At 1105, a reference CTF for a channel may be computed. For example, a reference CTF for channel k is determined. The reference CTF may be determined using procedures 1106, 1108, and 1110 as described above.

At 1107, a measurement of two channels at time (or interval) $t_n$ may be performed to determine the CTF. As shown, at 1107, the reference and the reflected signals may be obtained to determine the CTF of channel k at time $t_n$. Similarly, the reference and the reflected signals may be obtained to determine the CTF of channel m at time $t_n$.

After 1107, at 1118, in some embodiments, the delay of a future measurement may be determined using a minimization Euclidian distance technique and based on a reference CTF. For example, a delay compensation may be performed using the reference CTF obtained at 1105.

At 1120, the delay compensation operation can be applied to the measurement at time $t_n$ based on the reference CTF using a minimization Euclidian distance technique. For example, the minimization Euclidian distance technique may be given as $|\{\hat{x}(t_0)-x(t_n)*\exp(i\omega\Delta)\}|^2\rightarrow 0$ for given $\Delta$ where $\Delta$ is the delay.

The procedure can continue by applying procedure 1112 which is similar to procedure 1012 of FIG. 10. At 1112, the corrected CTF of the different WLAN channels (e.g., channel k and m) may be merged. For example, the corrected CTF of a channel k and the corrected CTF of k channel m are merged.

Figure 12A:
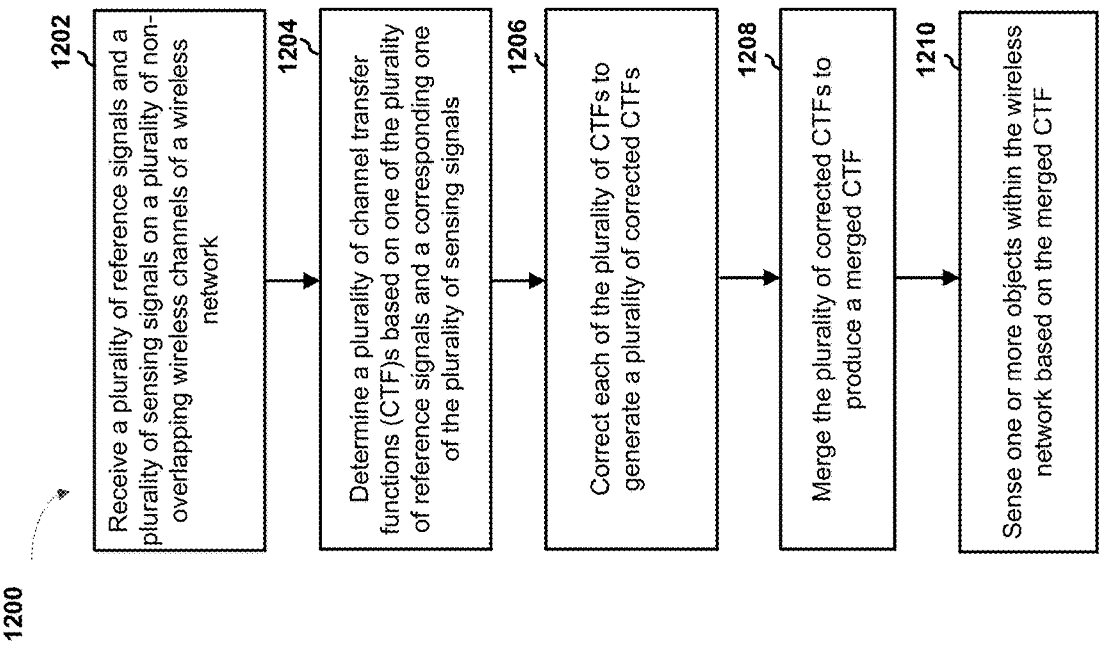
FIG. 12A is a flow diagram of a method of delay compensation, according to some embodiments of the present disclosure.

FIG. 12A is a flow diagram of a method 1200 for removing the delay from sensing signals, in accordance with some embodiments of the present disclosure. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1200 may be performed by the processing device 105 executing module 107B.

Referring also to FIG. 12A, at block 1202, the processing device 105 may receive a plurality of reference signals and a plurality of sensing signals on a plurality of non-overlapping wireless channels of a wireless network.

At block 1204, the processing device may determine a plurality of CTFs based on one of the plurality of reference signals and a corresponding one of the plurality of sensing signals.

At block 1206, the processing device 105 may correct each of the plurality of CTFs to generate a plurality of corrected CTFs.

At block 1208, the processing device 105 may merge the plurality of corrected CTFs to produce a merged CTF.

At block 1210, the processing device 105 may sense one or more objects within the wireless network based on the merged CTF.

Figure 12B:
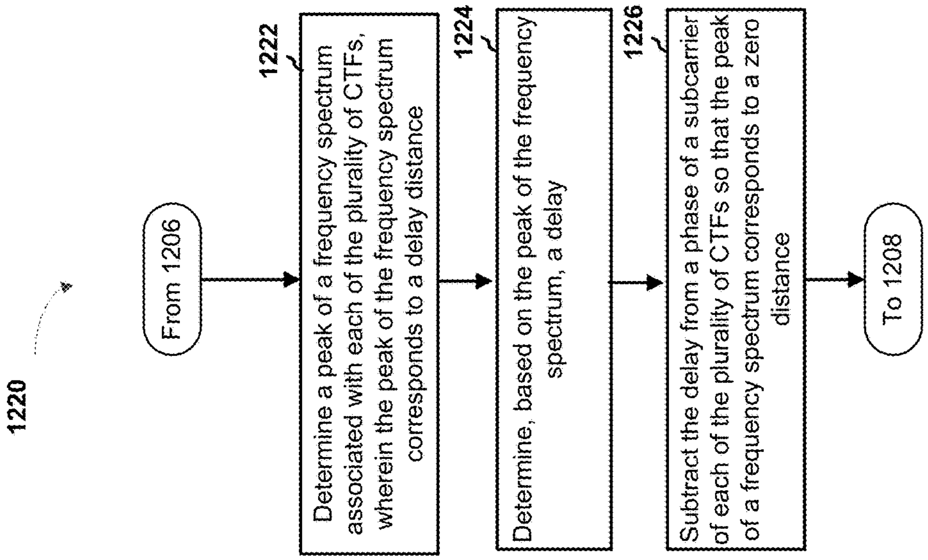
FIG. 12B is a flow diagram of a method of delay compensation, according to some embodiments of the present disclosure.

FIG. 12B is a flow diagram of a method 1220 for performing a delay compensation in accordance with some embodiments of the present disclosure. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1100 may be performed by the processing device 105 executing module 107B.

Referring to FIG. 12B, at block 1222, the processing device 105 may determine a peak of a frequency spectrum associated with each of the plurality of CTFs, wherein the peak of the frequency spectrum corresponds to a delay distance.

At block 1224, the processing device 105 may determine, based on the peak of the frequency spectrum, a delay.

At block 1226, the processing device 105 may subtract the delay from a phase of a subcarrier of each of the plurality of CTFs so that the peak of a frequency spectrum corresponds to a zero distance.

Figure 13:
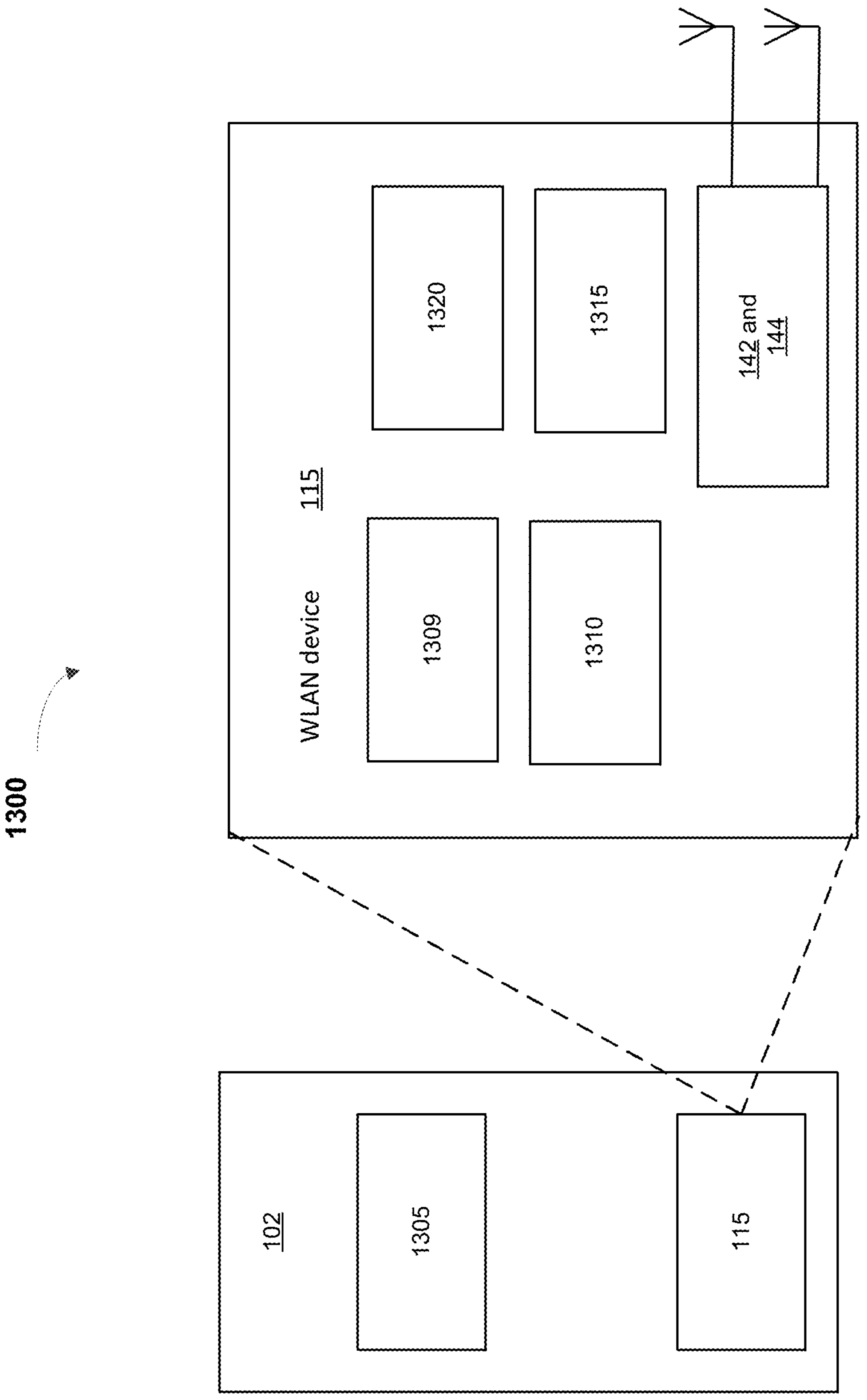
FIG. 13 is a detailed block diagram of the wireless communication device of FIG. 1, according to some embodiments of the present disclosure.

FIG. 13 is a simplified block diagram 1300 of the communication device 102 with a more detailed view of the WLAN device 115 inset, in accordance with some embodiments of the present disclosure. The device 102 may include a general purpose input/output (GPIO) 1305, and the WLAN device 115. The WLAN device 115 may be connected to antenna 142 and 144. The GPIO 1305 may comprise an uncommitted digital signal pin which may be used as an input or output for the WLAN device 115. The WLAN device 115 may include a processing device 1309, a memory 1310, a physical layer chip 1315 and a media access control (MAC) layer chip 1320. The physical layer chip 1315 may handle conversion of a signal from a clocked digital format into an analog format suitable for longer range transmission and vice versa. The MAC layer chip 1320 may assemble bits received from the physical layer chip 1315 into packets and validate them, as well as receive packets of data from the processing device 1309 for example, and convert them to streams of bits to be provided to the physical layer chip 1315. It should be noted that FIG. 13 illustrates an embodiment where the WLAN device 115 include their own dedicated processing device and memory, and the instructions for performing the techniques described herein may be included as firmware within the memory of the WLAN device 115.

Figure 14:
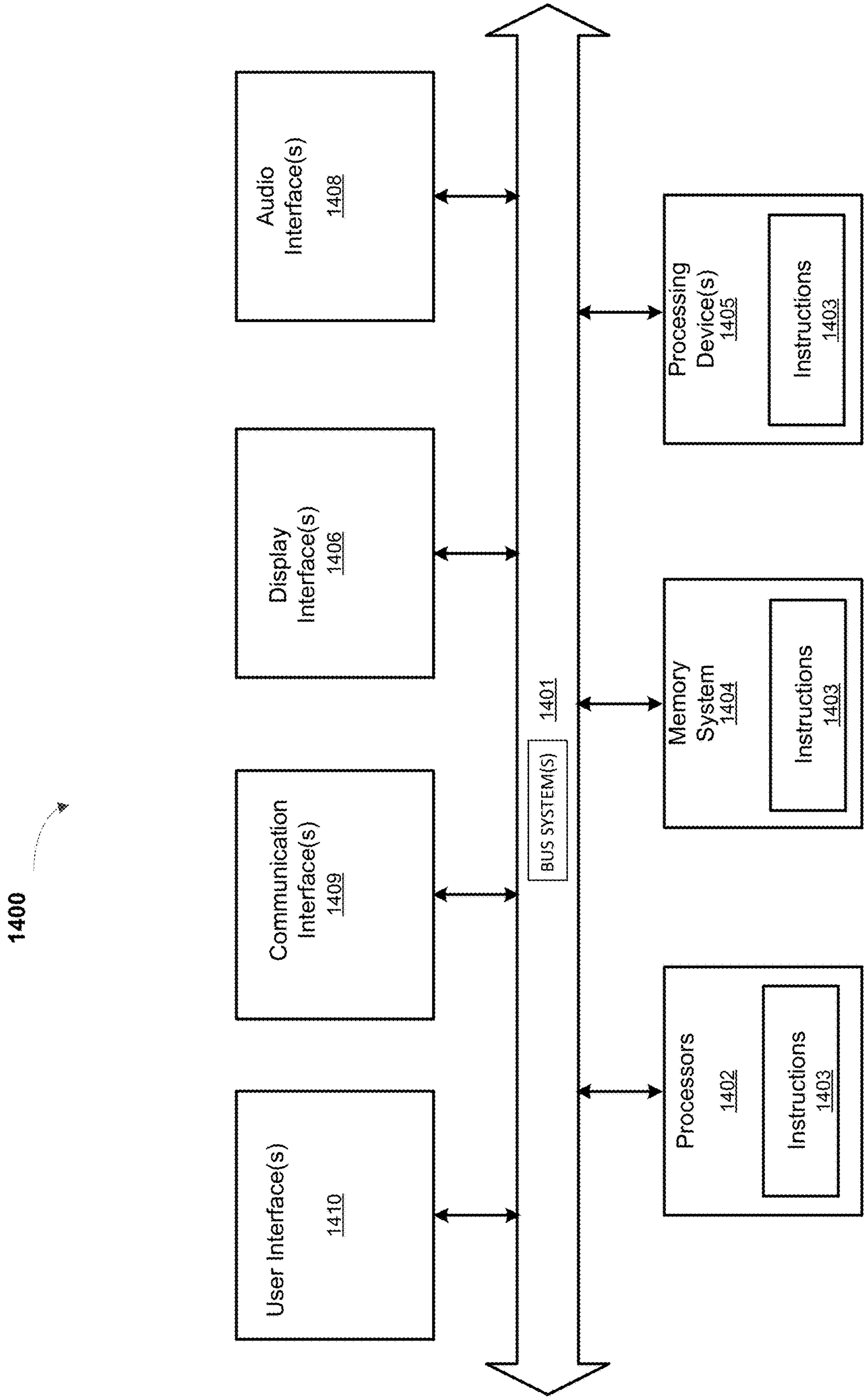
FIG. 14 illustrates a communication device, according to some embodiments of the present disclosure.

FIG. 14 is a block diagram illustrating a communication device 1400, in accordance with some embodiments of the present disclosure. The communication device 1400 may fully or partially include and/or operate the example embodiments of the communication device 102 or portions thereof as described with respect to FIGS. 1-9. The communication device 1400 may be in the form of a computer system within which sets of instructions may be executed to cause the communication device 1400 to perform any one or more of the methodologies discussed herein. The communication device 1400 may operate as a standalone device or may be connected (e.g., networked) to other machines. In a networked deployment, the communication device 1400 may operate in the capacity of a server or a client machine in server-client network environment, or as a peer machine in a P2P (or distributed) network environment.

The communication device 1400 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single communication device 1400 is illustrated, the term "device" shall also be taken to include any collection of machines that individually or jointly execute a set (or multiple sets) of instructions to perform any one or more of the methodologies discussed herein.

The communication device 1400 is shown to include processor(s) 1402.

In embodiments, the communication device 1400 and/or processors(s) 1402 may include processing device(s) 1405 such as a System on a Chip processing device, developed by Cypress Semiconductor Corporation, San Jose, Calif. Alternatively, the communication device 1400 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 1401 may include a communication block (not shown) to communicate with an internal or external component, such as an embedded controller or an application processor, via communication interfaces(s) 1409 and/or bus system 1401.

Components of the communication device 1400 may reside on a common carrier substrate such as an IC die substrate, a multi-chip module substrate, or the like. Alternatively, components of the communication device 1400 may be one or more separate ICs and/or discrete components.

The memory system 1404 may include volatile memory and/or non-volatile memory which may communicate with one another via the bus system 1401. The memory system 1404 may include, for example, random access memory (RAM) and program flash. RAM may be static RAM (SRAM), and program flash may be a non-volatile storage, which may be used to store firmware (e.g., control algorithms executable by processor(s) 1402 to implement operations described herein). The memory system 1404 may include instructions 1403 that when executed perform the methods described herein. Portions of the memory system 1404 may be dynamically allocated to provide caching, buffering, and/or other memory-based functionalities.

The memory system 1404 may include a drive unit providing a machine-readable medium on which may be stored one or more sets of instructions 1403 (e.g., software) embodying any one or more of the methodologies or functions described herein. The instructions 1403 may also reside, completely or at least partially, within the other memory devices of the memory system 1404 and/or within the processor(s) 1402 during execution thereof by the communication device 1400, which in some embodiments, constitutes machine-readable media. The instructions 1403 may further be transmitted or received over a network via the communication interfaces(s) 1409. The communication interface(s) 1409 may be where the communication device 102 discussed herein is implemented.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The communication device 1400 is further shown to include display interface(s) 1406 (e.g., a liquid crystal display (LCD), touchscreen, a cathode ray tube (CRT), and software and hardware support for display technologies), audio interface(s) 1408 (e.g., microphones, speakers and software and hardware support for microphone input/output and speaker input/output). The communication device 1400 is also shown to include user interface(s) 1410 (e.g., keyboard, buttons, switches, touchpad, touchscreens, and software and hardware support for user interfaces).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting," "receiving," "comparing," "determining," "detecting," "classifying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A method comprising:

receiving a plurality of reference signals and a plurality of sensing signals on a plurality of non-overlapping wireless channels of a wireless network;

determining a plurality of channel transfer functions (CTF) s based on one of the plurality of reference signals and a corresponding one of the plurality of sensing signals, wherein determining the plurality of CTFs comprises, for each of a plurality of subcarriers of a corresponding wireless channel, calculating a ratio between a complex amplitude of the corresponding sensing signal on the subcarrier and a complex amplitude of the corresponding reference signal on the subcarrier, the corresponding reference signal being received at a receiver via a coupling of a transmitter and the receiver of a same transceiver operating on the corresponding wireless channel such that the reference signal corresponds to a parasitic coupling path having a distance approximated as zero;

correcting each of the plurality of CTFs to generate a plurality of corrected CTFs;

merging the plurality of corrected CTFs to produce a merged CTF; and sensing one or more objects within the wireless network based on the merged CTF.

2. The method of claim 1, wherein the correcting each of the plurality of CTFs comprises:

determining a peak of a frequency spectrum associated with each of the plurality of CTFs, wherein the peak of the frequency spectrum corresponds to a delay distance;

determining, based on the peak of the frequency spectrum, a delay; and subtracting the delay from a phase of a subcarrier of each of the plurality of CTFs so that the peak of a frequency spectrum corresponds to a zero distance.

3. The method of claim 1, wherein the reference signal determines a transmission time and a shape of a transmitted signal associated with the plurality of sensing signals.

4. The method of claim 1, wherein the plurality of sensing signals comprise a parasitic signal caused by an internal coupling within a transceiver and an antenna coupling between a plurality of transceivers.

5. The method of claim 4, wherein an amplitude value of the parasitic signal is smaller than an amplitude value of the reference signal, a first peak of each of the plurality of CTFs corresponds to the parasitic signal.

6. The method of claim 1, further comprising:

averaging the plurality of corrected CTFs to generate an averaged corrected CTFs.

7. The method of claim 1, wherein the plurality of non-overlapping wireless channels include a first non-overlapping wireless channel, the corrected CTF associated with the first non-overlapping wireless channel being generated based on a first measurement at a first time period, and the corrected CTF associated with the first non-overlapping wireless channel being used to determine a new corrected CTF associated with a second measurement at a second time period.

8. The method of claim 7, wherein the corrected CTF associated with the first non-overlapping wireless channel is compared from the new corrected CTF associated with the second measurement at the second time period to determine a change in an environment between the first time period and the second time period.

9. The method of claim 1, wherein the wireless network is a wireless local area network (WLAN).

10. An apparatus comprising:

a device configured to receive a reference signal and a sensing signal;

a processing device operatively coupled to the device, the processing device configured to:

receive a plurality of reference signals and a plurality of sensing signals on a plurality of non-overlapping wireless channels of a wireless network;

determine a plurality of channel transfer functions (CTF) s based on one of the plurality of reference signals and a corresponding one of the plurality of sensing signals, wherein to determine the plurality of CTFs comprises, for each of a plurality of subcarriers of a corresponding wireless channel, to calculate a ratio between a complex amplitude of the corresponding sensing signal on the subcarrier and a complex amplitude of the corresponding reference signal on the subcarrier, the corresponding reference signal being received at a receiver via a coupling of a transmitter and the receiver of a same transceiver operating on the corresponding wireless channel such that the reference signal corresponds to a parasitic coupling path having a distance approximated as zero;

correct each of the plurality of CTFs to generate a plurality of corrected CTFs;

merge the plurality of corrected CTFs to produce a merged CTF; and sense one or more objects within the wireless network based on the merged CTF.

11. The apparatus of claim 10, wherein to correct each of the plurality of CTFs, the processing device is configured to:

determine a peak of a frequency spectrum associated with each of the plurality of CTFs, wherein the peak of the frequency spectrum corresponds to a delay distance;

determine, based on the peak of the frequency spectrum, a delay; and subtract the delay from a phase of a subcarrier of each of the plurality of CTFs so that the peak of a frequency spectrum corresponds to a zero distance.

12. The apparatus of claim 10, wherein the reference signal determines a transmission time and a shape of a transmitted signal associated with the plurality of sensing signals.

13. The apparatus of claim 12, wherein the plurality of sensing signals comprises a parasitic signal caused by an internal coupling within a transceiver and an antenna coupling between a plurality of transceivers.

14. The apparatus of claim 13, wherein an amplitude value of the parasitic signal is smaller than an amplitude value of the reference signal, a first peak of each of the plurality of CTFs corresponds to the parasitic signal.

15. The apparatus of claim 10, the processing device is further configured to:

averaging the plurality of corrected CTFs to generate an averaged corrected CTFs.

16. The apparatus of claim 10, wherein the plurality of non-overlapping wireless channels include a first non-overlapping wireless channel, the corrected CTF associated with the first non-overlapping wireless channel being generated based on a first measurement at a first time period, and the corrected CTF associated with the first non-overlapping wireless channel being used to determine a new corrected CTF associated with a second measurement at a second time period.

17. The apparatus of claim 16, wherein the corrected CTF associated with the first non-overlapping wireless channel is subtracted from the new corrected CTF associated to determine a change in an environment between the first time period and the second time period.

18. The apparatus of claim 10, wherein the wireless network is a wireless area local network (WLAN).

19. A non-transitory computer-readable medium storing instructions that, when executed by one or more processors of a wireless communications device in a wireless network, cause the wireless communications device to:

receive a plurality of reference signals and a plurality of sensing signals on a plurality of non-overlapping wireless channels of the wireless network;

determine a plurality of channel transfer functions (CTF) s based on one of the plurality of reference signals and a corresponding one of the plurality of sensing signals, wherein to determine the plurality of CTFs comprises, for each of a plurality of subcarriers of a corresponding wireless channel, to calculate a ratio between a complex amplitude of the corresponding sensing signal on the subcarrier and a complex amplitude of the corresponding reference signal on the subcarrier, the corresponding reference signal being received at a receiver via a coupling of a transmitter and the receiver of a same transceiver operating on the corresponding wireless channel such that the reference signal corresponds to a parasitic coupling path having a distance approximated as zero;

correct each of the plurality of CTFs to generate a plurality of corrected CTFs;

merge the plurality of corrected CTFs to produce a merged CTF; and sense one or more objects based on the merged CTF.

20. The non-transitory computer-readable medium of claim 19, wherein to correct each of the plurality of CTFs, wherein execution of the instructions further causes the wireless communications device to:

determine a peak of a frequency spectrum associated with each of the plurality of CTFs, wherein the peak of the frequency spectrum corresponds to a delay distance;

determine, based on the peak of the frequency spectrum, a delay; and subtract the delay from a phase of a subcarrier of each of the plurality of CTFs so that the peak of a frequency spectrum corresponds to a zero distance.

* * * * *